US008084160B2

(12) United States Patent
Seino et al.

(10) Patent No.: US 8,084,160 B2
(45) Date of Patent: Dec. 27, 2011

(54) METHOD FOR PURIFYING LITHIUM SULFIDE

(75) Inventors: Yoshikatsu Seino, Ichihara (JP); Minoru Senga, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 813 days.

(21) Appl. No.: 10/576,721

(22) PCT Filed: Oct. 15, 2004

(86) PCT No.: PCT/JP2004/015231
§ 371 (c)(1),
(2), (4) Date: Jan. 26, 2007

(87) PCT Pub. No.: WO2005/040039
PCT Pub. Date: May 6, 2005

(65) Prior Publication Data
US 2007/0196739 A1    Aug. 23, 2007

(30) Foreign Application Priority Data
Oct. 23, 2003   (JP) ................. 2003-363403

(51) Int. Cl.
*H01M 10/0562* (2010.01)
(52) U.S. Cl. ........ 429/322; 429/321; 429/304; 429/188; 429/189
(58) Field of Classification Search ............... 429/7, 12, 429/34, 188, 189, 304, 321, 322; *H01M 10/0562*
See application file for complete search history.

(56) References Cited

U.S. PATENT DOCUMENTS

| | | | | |
|---|---|---|---|---|
| 6,022,640 A | * | 2/2000 | Takada et al. | 429/231.95 |
| 6,455,022 B1 | * | 9/2002 | Delmas | 423/499.1 |
| 6,503,473 B1 | * | 1/2003 | Akiba | 423/560 |
| 2004/0109940 A1 | * | 6/2004 | Kugai et al. | 427/58 |

FOREIGN PATENT DOCUMENTS

| | | |
|---|---|---|
| CN | 1333575 | 1/2002 |
| JP | 7-330312 | 12/1995 |
| JP | 07330312 | 12/1995 |
| JP | 9-110404 | 4/1997 |
| JP | 9-278423 | 10/1997 |
| JP | 9-283156 | 10/1997 |
| JP | 9-301706 | 11/1997 |
| JP | 10-130005 | 5/1998 |
| JP | 2000273175 | 10/2000 |
| JP | 2003-68361 | 3/2003 |

OTHER PUBLICATIONS

English transation of JP 07330312 (cited by applicants on IDS).*
Database WPI Week 199727 Derwent Publications Ltd., London, GB; AN 1997-294617 XP002480255 & JP 09 110404 A (Furukawa Kikai Kinzoku KK) Apr. 28, 1997 (Abstract).
Office Action issued Dec. 15, 2010, in Japan Patent Application No. 2005-514938 (with partial English translation).
Office Action issued May 13, 2011 in Taiwan Patent Application No. 093132259.

* cited by examiner

*Primary Examiner* — Jennifer Michener
*Assistant Examiner* — Heng Chan
(74) *Attorney, Agent, or Firm* — Oblon, Spivak, McClelland, Maier & Neustadt, L.L.P.

(57) ABSTRACT

A method of purifying lithium sulfide wherein lithium sulfide obtained by reacting lithium hydroxide with hydrogen sulfide in an aprotic organic solvent is washed with an organic solvent at a temperature of 100° C. or higher. Impurities contained in lithium sulfide can be reduced by the method of purification.

14 Claims, No Drawings

METHOD FOR PURIFYING LITHIUM SULFIDE

TECHNICAL FIELD

The invention relates to a method of purifying lithium sulfide by which impurities such as sulfur oxides and lithium N-methylaminobutyrate (hereinafter referred to as LMAB) can efficiently be removed from lithium sulfide used for electronic and electric materials. Further, the invention relates to a solid electrolyte for a lithium rechargeable battery and a solid battery using the same.

BACKGROUND ART

Recently, demand is increasing for high-performance lithium rechargeable batteries and the like for use in portable information terminals, portable electronic devices, compact power storage devices for home use, and electric motor bicycles, electric cars, hybrid electric cars and the like that are powered by electric motors. The rechargeable battery is a battery capable of being charged and discharged. During use, the rechargeable battery is subjected to repeated charge and discharge over a long period of time. Its components therefore have to have long-term stability and durability.

When the purity of a raw material such as a solid electrolyte used in a rechargeable battery is low, deterioration of the components is liable to be accelerated. Thus, purity of the solid electrolyte or other such raw material is required to be high.

The applicant found a method of producing lithium sulfide which can produce lithium sulfide in a high purity using simple means (JP-A-H07-330312). In this method, lithium sulfide is produced in an aprotic organic solvent such as N-methyl-2-pyrrolidone (hereinafter referred to as NMP), and it is an economical and simple method because the production steps thereof can be conducted continuously. However, LMAB, which is an impurity derived from NMP, comes to be mixed in the resultant lithium sulfide.

JP-A-H09-283156 discloses a method of producing lithium sulfide wherein lithium hydroxide and a gaseous sulfur source are reacted at a temperature of at lowest 130° C. to at highest 445° C. Sulfur oxides (such as lithium sulfite, lithium sulfate, and lithium thiosulfate) which are formed in the production process of lithium sulfide come to be mixed in the lithium sulfide produced by this method.

When the lithium sulfide produced by the above-mentioned methods is used as a raw material of a solid electrolyte for a lithium rechargeable battery or the like, the solid electrolyte deteriorates due to the repetition of charge and discharge, and the desired battery performance cannot be realized.

One object of the invention is to solve the above-mentioned problems by providing a method of purifying lithium sulfide wherein impurities contained in lithium sulfide constituting a raw material for a solid electrolyte of a lithium rechargeable battery are minimized.

Another object of the invention is to provide a solid electrolyte for a lithium rechargeable battery using lithium sulfide in which the impurities are minimal, and a solid battery using the same.

DISCLOSURE OF THE INVENTION

The inventors carried out committed studies to achieve these objects, and found that the impurities can be efficiently removed from the lithium sulfide produced by the method disclosed in the above-mentioned JP-A-H07-330312 by washing it with an organic solvent having a boiling point of 100° C. or higher, such as NMP, at a temperature of 100° C. or higher. The invention was accomplished on the basis of this finding.

Namely, in its first aspect the invention provides a method of purifying lithium sulfide wherein lithium sulfide obtained by reacting lithium hydroxide with hydrogen sulfide in an aprotic organic solvent is washed with an organic solvent at a temperature of 100° C. or higher.

In its second aspect the invention provides a solid electrolyte for a lithium rechargeable battery using the lithium sulfide purified by the above-mentioned method of the first aspect.

In its third aspect the invention provides a solid battery using the solid electrolyte for a lithium rechargeable battery of the above-mentioned second aspect.

According to the invention, lithium sulfide in which the contents of sulfur oxides are reduced to 0.15% by weight or less and the content of LMAB is reduced to 0.1% by weight can economically be obtained.

Further, use of the resultant high-purity lithium sulfide as the solid electrolyte of a lithium rechargeable battery minimizes impurity-induced deterioration to enable realization of a lithium rechargeable battery (solid battery) excellent in the long-term stability.

BEST MODE FOR CARRYING OUT THE INVENTION

The invention will be described in detail below.

The method of purifying lithium sulfide of the first aspect of the invention (hereinafter referred to as the method of the invention) is characterized in that lithium sulfide produced by reacting lithium hydroxide with hydrogen sulfide in an aprotic organic solvent is washed with an organic solvent at a temperature of 100° C. or higher.

The lithium sulfide to be purified by the method of the invention is one produced by the method of producing lithium sulfide disclosed in JP-A-H07-330312. In particular, in the method of production disclosed in JP-A-H07-330312, lithium hydroxide is reacted with hydrogen sulfide at a temperature of 0 to 150° C. while injecting hydrogen sulfide into an aprotic organic solvent, to form lithium hydrosulfide, and then, hydrogen sulfide is removed from the reaction solution at a temperature of 150 to 200° C. without injection of hydrogen sulfide to obtain lithium sulfide, or lithium hydroxide and hydrogen sulfide are reacted in an aprotic organic solvent at a temperature of 150 to 200° C. to directly produce lithium sulfide.

As the aprotic organic solvent used for the production of lithium sulfide, in general, an aprotic polar organic solvent (such as amido compounds, lactam compounds, urea compounds, organic sulfur compounds, and cyclic organic phosphorous compounds) may preferably be used individually or in combination.

Of the above-mentioned various kinds of aprotic organic solvents, preferred are N-methyl-2-pyrrolidone, N-alkylcaprolactam and N-alkylpyrrolidone, and particularly preferred is N-methyl-2-pyrrolidone.

The lithium hydroxide used as raw material for production of lithium sulfide is not particularly limited, and a commercially available product can be used so long as it is of high purity. The other raw material, hydrogen sulfide, is also not particularly limited. Further, reaction conditions for the production of lithium sulfide, the relative amounts of the raw materials used, and the like are determined as set out in JP-A-H07-330312.

The method of the invention is characterized by using the lithium sulfide produced by the above-mentioned method disclosed in JP-A-H07-330312, and washing it with an organic solvent at a temperature of 100° C. or higher. The organic solvent is used at a temperature of 100° C. or higher because LMAB, which is an impurity, formed in the case where NMP is used as the aprotic organic solvent for the production of lithium sulfide, dissolves in the organic solvent at a temperature of 100° C. Namely, LMAB dissolves in the organic solvent for washing to remove it from lithium sulfide.

Thus, the temperature of the organic solvent used is not particularly limited so long as it is 100° C. or higher, and may arbitrarily be selected. However, the temperature of the organic solvent used is lower than its boiling point. For instance, when using NMP, the temperature is at highest 203° C., the boiling point at normal pressures, and at highest 250° C. under pressure in the case where a well-closed vessel or the like is used.

The organic solvent used for washing in the method of the invention is preferably an aprotic polar solvent. Further, it is more preferred that the aprotic organic solvent used for production of lithium sulfide be identical to the aprotic polar organic solvent used for washing.

Preferable aprotic polar organic solvents used for washing include aprotic polar organic compounds such as amido compounds, lactam compounds, urea compounds, organic sulfur compounds, and cyclic organic phosphorous compounds. They may be used preferably either individually or in a mixture. Of these aprotic polar organic solvents, the above-mentioned amido compounds include N,N-dimethylformamide, N,N-diethylformamide, N,N-dimethylacetamide, N,N-dipropylacetamide, and N,N-dimethyl benzoic acid amide. The above-mentioned lactam compounds include caprolactam; N-alkylcaprolactams such as N-methylcaprolactam, N-ethylcaprolactam, N-isopropylcaprolactam, N-isobutylcaprolactam, N-n-propylcaprolactam, N-n-butylcaprolactam, and N-cyclohexylcaprolactam; N-methyl-2-pyrrolidone (NMP), N-ethyl-2-pyrrolidone, N-isopropyl-2-pyrrolidone, N-isobutyl-2-pyrrolidone, N-n-propyl-2-pyrrolidone, N-n-butyl-2-pyrrolidone, N-cyclohexyl-2-pyrrolidone, N-methyl-3-methyl-2-pyrrolidone, N-ethyl-3-methyl-2-pyrrolidone, N-methyl-3,4,5-trimethyl-2-pyrrolidone, N-methyl-2-piperidone, N-ethyl-2-piperidone, N-isopropyl-2-piperidone, N-methyl-6-methyl-2-piperidone, and N-methyl-3-ethyl-2-piperidone. The above-mentioned organic sulfur compounds include dimethyl sulfoxide, diethyl sulfoxide, diphenylene sulfone, 1-methyl-1-oxosulfolane, and 1-phenyl-1-oxosulfolane. These various kinds of aprotic organic compounds may be used, as the above-mentioned aprotic organic solvent, individually or in a mixture of two or more, alternatively used in a mixture with another solvent component which does not hinder achievement of the object of the invention. Of the above-mentioned various kinds of aprotic organic solvent, N-alkylcaprolactam and N-alkylpyrrolidone are preferred, and N-methyl-2-pyrrolidone (NMP) is particularly preferred.

The amount of the organic solvent used for washing is not particularly limited, and the number of times for washing is also not particularly limited but is preferably twice or more.

In the method of the invention, the washing is preferably carried out under an inert gas such as nitrogen or argon.

Now, operations in the method of the invention will be described taking as an example the case where NMP is used as both the aprotic organic solvent for the production of lithium sulfide and the organic solvent for washing.

(1) Lithium sulfide is produced by the method disclosed in the above-mentioned JP-A-H07-330312 using NMP as the aprotic organic solvent.

(2) The NMP in the resultant reaction solution slurry (NMP-lithium sulfide slurry) is removed by decantation or filtration at a temperature of 100° C. or higher.

(3) Fresh NMP is added to the resultant crude lithium sulfide to wash the lithium sulfide at a temperature of 100° C. or higher, followed by decantation or filtration at a temperature of 100° C. or higher under an inert gas such as nitrogen. This washing operation is carried out once or more.

(4) The lithium sulfide after washing is dried at a temperature of at lowest the boiling point of the NMP used for washing under a stream of an inert gas such as nitrogen and at normal pressure or under reduced pressure for 5 minutes or more (preferably approximately 2 to 3 hours or more), to obtain purified lithium sulfide.

According to the method of the invention, highly purified lithium sulfide can be obtained in which the total content of sulfur oxides is 0.15% by weight or less, preferably 0.1% by weight or less, and the content of lithium N-methylaminobutyrate (LMAB) is 0.1% by weight or less.

The larger the number of washing repetitions is, the smaller the total sulfur oxides content and the lithium N-methylaminobutyrate (LMAB) content become, both of which are preferably minimized. However, taking the practical production processes into consideration, the number of washings is considered to be about 10 or less. Repetition of the washing about 10 times enables reduction of the total sulfur oxides content to approximately 0.001% by weight and the lithium N-methylaminobutyrate (LMAB) content to approximately 0.0005% by weight.

Next, the solid electrolyte for a lithium rechargeable battery using the lithium sulfide purified by the above-mentioned method of the invention and the solid battery using the same according to the second and third aspects of the invention will be described.

The solid electrolyte synthesized by using the lithium sulfide purified by the method of the invention, has electrical properties suitable for a solid electrolyte for a lithium rechargeable battery, such as an ionic conductance of $1.0 \times 10^{-3}$ s/cm or higher, preferably $1.1 \times 10^{-3}$ s/cm or higher.

The lithium sulfide purified by the method of the invention is reduced in impurities that adversely affect the long-term stability of a battery. Further, although it is not known exactly why, the manner in which the impurities are contained in the lithium sulfide after purification gives rise to ionic conductance suitable for the solid electrolyte of a lithium rechargeable battery, and the desired battery performance can be maintained for a long period of time, even when charge and discharge are repeated.

The solid battery excellent in long-term stability can be obtained by using the solid electrolyte for a lithium rechargeable battery having the good properties mentioned above.

Conventionally used methods can be utilized to make the lithium sulfide purified by the method of the invention into the solid electrolyte for a lithium rechargeable battery, and to produce a solid battery using the solid electrolyte.

The invention will be described more concretely with reference to examples and comparative examples below.

Example 1

(1) Production of Lithium Sulfide

Lithium sulfide was produced in accordance with the first aspect (two-step method) disclosed in JP-A-H07-330312.

Specifically, 3326.4 gram (33.6 moles) of N-methyl-2-pyrrolidone (NMP) and 287.4 gram (12 moles) of lithium hydroxide were charged into a 10 liter autoclave equipped with a stirring paddle and heated to 130° C. under stirring at 300 rpm. The heating was followed by injection of hydrogen sulfide into the reaction solution at a feed rate of 3 liter/minute for 2 hours. Subsequently, the temperature of the reaction solution was increased under a nitrogen stream (200 cc/minute) to remove a part of hydrogen sulfide which started generating from the reaction product. As the temperature of the reaction solution increased, water generated as a by-product of the reaction of the above-mentioned hydrogen sulfide and lithium hydroxide started to evaporate. The water was condensed with a condenser and discharged outside the reaction system. As the distilling off of the water to outside the reaction system proceeded, the temperature of the reaction solution increased, and increase in temperature was terminated when the temperature reached 180° C., whereafter the reaction solution was held at a constant temperature. The reaction terminated following (by about 80 minutes) the end of the reaction for removal of hydrogen sulfide to afford lithium sulfide.

(2) Purification of Lithium Sulfide

NMP was removed by decantation from 500 mL of the reaction solution slurry (NMP-lithium sulfide slurry) obtained in the above-mentioned step (1), and then, 100 mL of dehydrated NMP was added thereto and stirred at a temperature of 105° C. for about one hour. NMP was removed by decantation while maintaining the temperature of the slurry. One hundred mL of NMP was again added thereto and stirred at a temperature of 105° C. for about one hour. NMP was removed by decantation while maintaining the temperature of the slurry. This operation was repeated four times in total. After completion of the decantation, the lithium sulfide was dried at a temperature of 230° C. (at the NMP boiling point temperature or higher) under a nitrogen stream at normal pressure for three hours. The contents of the impurities contained in the resultant lithium sulfide were determined. The results are shown in Table 1 below.

The amounts of lithium sulfite ($Li_2SO_3$), lithium sulfate ($Li_2SO_4$), lithium thiosulfate ($Li_2S_2O_3$) and lithium N-methylaminobutyrate (LMAB), which are impurities, were determined by ion chromatography.

Example 2

Lithium sulfide was obtained in the same manner as in Example 1 except that the drying conditions were changed from at a temperature of 230° C. under nitrogen stream at normal pressures to at a temperature of 230° C. under reduced pressure. The contents of the impurities contained in the resultant lithium sulfide were determined, and the results are shown in Table 1 below.

Example 3

Lithium sulfide was obtained in the same manner as in Example 2 except that washing with NMP was repeated ten times. The contents of the impurities contained in the resultant lithium sulfide were determined, and the results are shown in Table 1 below.

Comparative Example 1

NMP was removed by decantation from 500 mL of the reaction solution slurry (NMP-lithium sulfide slurry) produced in Example 1 and the impurity contents of the so-obtained crude lithium sulfide (i.e., lithium sulfide not subjected to NMP washing) were determined. The results are shown in Table 1 below.

Comparative Example 2

Lithium sulfide was obtained in the same manner as in Example 1 except that the washing temperature was changed from 105° C. to normal temperature. The contents of the impurities contained in the resultant lithium sulfide were determined, and the results are shown in Table 1 below.

Comparative Example 3

Lithium sulfide was obtained in the same manner as in Example 1 except that the washing solvent was changed to dimethoxyethane (boiling point: 82 to 83° C.), and the washing temperature was changed to 70° C. The contents of the impurities contained in the resultant lithium sulfide were determined, and the results are shown in Table 1 below.

Comparative Examples 4 to 6

The contents of the impurities contained in the below-mentioned commercial products of lithium sulfide produced by methods different from the method disclosed in JP-A-H07-330312 were determined, and the results are shown in Table 1 below.
Comparative Example 4: lithium sulfite; manufactured by Aldrich Chemical Company, Inc.
Comparative Example 5: lithium sulfite; manufactured by Furuuchi Chemical Corporation
Comparative Example 6: lithium sulfite; manufactured by Kishida Chemical Co., Ltd.

TABLE 1

|  | $Li_2SO_3$ (wt %) | $Li_2SO_4$ (wt %) | $Li_2S_2O_3$ (wt %) | LMAB (wt %) |
|---|---|---|---|---|
| Example 1 | 0.08 | 0.05 | 0.00 | 0.07 |
| Example 2 | 0.07 | 0.04 | 0.00 | 0.06 |
| Example 3 | 0.0006 | 0.0004 | 0.0000 | 0.0005 |
| Comparative Example 1 | 0.37 | 0.17 | 0.01 | 5.00 |
| Comparative Example 2 | 0.30 | 0.15 | 0.01 | 5.00 |
| Comparative Example 3 | 0.09 | 0.04 | 0.01 | 4.60 |
| Comparative Example 4 | — | 3.90 | 0.78 | 0.00 |
| Comparative Example 5 | — | 5.90 | 1.80 | 0.00 |
| Comparative Example 6 | — | 5.20 | 1.90 | 0.00 |

From the results shown in Table 1, it can be seen that the purified lithium sulfide obtained in Examples 1 and 2 was lower in all impurities than the non-purified crude lithium sulfide produced by the method disclosed in JP-A-H07-330312 (Comparative Example 1).

The lithium sulfide of Comparative Example 2, which was obtained by washing at a temperature lower than 100° C., was lowered to the same level of lithium sulfite and lithium sulfate contents as the purified lithium sulfide obtained in Examples 1 and 2 but was not reduced in lithium thiosulfate and lithium N-methylaminobutyrate (LMAB) contents.

Further, although the commercial lithium sulfide products of Comparative Examples 4 to 6 produced by methods different from the method disclosed in JP-A-H07-330312 inherently contain no LMAB, they contain sulfur oxides in an amount significantly larger than the lithium sulfide produced by the method disclosed in JP-A-H07-330312 (Comparative Example 1).

The results of Example 1 and Comparative example 2 demonstrated that the desired washing effect cannot be obtained by washing at a temperature lower than 100° C., even when using the same solvent.

INDUSTRIAL APPLICABILITY

According to the method of the invention wherein lithium sulfide produced by the method disclosed in JP-A-H07-330312 is purified, impurities such as sulfur oxides and LMAB, which degrade the long-term stability of a lithium rechargeable battery, can be economically reduced. The invention further provides a solid electrolyte for a lithium rechargeable battery that is excellent in long-term stability and a solid battery using the same, which is excellent battery performance.

The invention claimed is:

1. A method of purifying lithium sulfide, comprising reacting lithium hydroxide with hydrogen sulfide in an aprotic organic solvent to produce lithium sulfide, and washing the lithium sulfide with an organic solvent at a temperature of 100° C. or higher wherein the organic solvent used for washing is N-methyl-2-pyrrolidone (NMP) and wherein lithium N-methylaminobutyrate (LMAB) in the washed lithium sulfide is present at a range of 0.1% by weight or less.

2. A lithium sulfide obtained by the method according to claim 1, wherein a total content of sulfur oxides in the washed lithium sulfide is 0.15% by weight or less.

3. A solid electrolyte for a lithium rechargeable battery comprising the lithium sulfide according to claim 2.

4. The solid electrolyte for a lithium rechargeable battery according to claim 3, wherein the ionic conductance is $1 \times 10^{-3}$ S/cm or higher.

5. A solid battery comprising the solid electrolyte for a lithium rechargeable battery according to claim 3.

6. A solid battery comprising the solid electrolyte for a lithium rechargeable battery according to claim 4.

7. The method according to claim 1, comprising:
reacting lithium hydroxide with hydrogen sulfide at a temperature of 0 to 150° C. in an aprotic organic solvent to obtain a lithium sulfide;
removing the aprotic organic solvent by decantation at a temperature of 100° C. or higher under an inert gas to provide a solid lithium sulfide;
adding an fresh aprotic organic solvent to the solid lithium sulfide to provide a dispersion of lithium sulfide;
stirring the dispersion of lithium sulfide at a temperature of 100° C. or higher; and
drying the stirred dispersion of lithium sulfide under a stream of inert gas at a normal pressure.

8. The lithium sulfide according to claim 2, wherein lithium N-methylaminobutyrate (LMAB) in the washed lithium sulfide is present at a range of 0.0005% by weight or less.

9. The lithium sulfide according to claim 2, wherein a total sulfur oxide content in the washed lithium sulfide is 0.001% by weight or less.

10. The lithium sulfide according to claim 2, wherein the total sulfur oxide content in the washed lithium sulfide is 0.001% by weight or less and lithium N-methylaminobutyrate (LMAB) in the washed lithium sulfide is present at a range of 0.0005% by weight or less.

11. The method according to claim 1, wherein the aprotic organic solvent in said reacting is identical to the aprotic organic solvent for washing.

12. The method according to claim 1, wherein the temperature of the organic solvent used is lower than the boiling temperature of the organic solvent.

13. The method according to claim 1, wherein the aprotic organic solvent in said reacting is selected from the group consisting of N,N-dimethylformamide, N,N-diethylformamide, N,N-dimethylacetamide, N,N-dipropylacetamide, and N,N-dimethyl benzoic acid amide, N-methylcaprolactam, N-ethylcaprolactam, N-isopropylcaprolactam, N-isobutylcaprolactam, N-n-propylcaprolactam, N-n-butylcaprolactam, and N-cyclohexylcaprolactam; N-methyl-2-pyrrolidone (NMP), N-ethyl-2-pyrrolidone, N-isopropyl-2-pyrrolidone, N-isobutyl-2-pyrrolidone, N-n-propyl-2-pyrrolidone, N-n-butyl-2-pyrrolidone, N-cyclohexyl-2-pyrrolidone, N-methyl-3-methyl-2-pyrrolidone, N-ethyl-3-methyl-2-pyrrolidone, N-methyl-3,4,5-trimethyl-2-pyrrolidone, N-methyl-2-piperidone, N-ethyl-2-piperidone, N-isopropyl-2-piperidone, N-methyl-6-methyl-2-piperidone, and N-methyl-3-ethyl-2-piperidone, or a mixture thereof.

14. A lithium sulfide obtained by the method according to claim 7, wherein a total content of sulfur oxides in the washed lithium sulfide is 0.15% by weight or less.

* * * * *